(12) United States Patent
Wang et al.

(10) Patent No.: US 11,459,756 B2
(45) Date of Patent: Oct. 4, 2022

(54) CORROSION-INDUCED SHAPE MEMORY FIBER, PREPARATION METHOD AND APPLICATION THEREOF

(71) Applicants: Qingdao University of Technology, Shandong (CN); Ziguo Wang, Shandong (CN)

(72) Inventors: Ziguo Wang, Shandong (CN); Yuyan Sun, Shandong (CN); Ziliang Wang, Hunan (CN)

( * ) Notice: Subject to any disclaimer, the term of this patent is extended or adjusted under 35 U.S.C. 154(b) by 323 days.

(21) Appl. No.: 16/683,282

(22) Filed: Nov. 14, 2019

(65) Prior Publication Data

US 2020/0149278 A1    May 14, 2020

(30) Foreign Application Priority Data

Nov. 14, 2018  (CN) .......................... 201811355681.8

(51) Int. Cl.
*E04C 5/08*    (2006.01)
*E04C 5/07*    (2006.01)
(Continued)

(52) U.S. Cl.
CPC ............ *E04C 5/073* (2013.01); *C04B 14/386* (2013.01); *C04B 14/42* (2013.01); *C04B 14/48* (2013.01); *C04B 2111/26* (2013.01)

(58) Field of Classification Search
CPC ... C04B 20/12; C04B 20/123; C04B 20/0068; C04B 20/1062; C04B 35/76; C04B 35/80; Y10T 428/2991; E04C 5/07; E04C 5/08
(Continued)

(56) References Cited

U.S. PATENT DOCUMENTS

| 5,611,874 | A | * | 3/1997 | Zadno-Azizi | ......... B32B 15/013 |
| | | | | | 343/715 |
| 2001/0050032 | A1* | | 12/2001 | Dry | .......................... C22C 49/00 |
| | | | | | 106/676 |

(Continued)

FOREIGN PATENT DOCUMENTS

CN            108395131 A  *  8/2018  ............. C04B 14/48

OTHER PUBLICATIONS

Luo and Mather, Shape Memory Assisted Self-Healing Costing, ACS Macro Lett. 2013, 2, 152-156-dx.doi.org/10.1021/mz400017x (Year: 2013).*

(Continued)

*Primary Examiner* — Hoa (Holly) Le (57) ABSTRACT

The present invention relates to a corrosion-induced shape memory fiber, a preparation method and application thereof. The corrosion-induced shape memory fiber is composed of a core fiber and/or a core fiber with a corrosion-resistant coating, and a corrodible coating; the core fiber and/or the core fiber with the corrosion-resistant coating are in a tensile stress state along the length of the corrosion-induced shape memory fiber; the corrodible coating is in a compressive stress state along the length of the corrosion-induced shape memory fiber; the core fiber and/or the core fiber with the corrosion-resistant coating and the corrodible coating are in a tensile-compressive equilibrium state along the length of the corrosion-induced shape memory fiber; and the corrodible coating is coated outside the core fiber and/or the core fiber with the corrosion-resistant coating.

9 Claims, 7 Drawing Sheets

(51) Int. Cl.
*C04B 14/38* (2006.01)
*C04B 14/48* (2006.01)
*C04B 14/42* (2006.01)
*C04B 111/26* (2006.01)

(58) Field of Classification Search
USPC .......................................................... 428/403
See application file for complete search history.

(56) References Cited

U.S. PATENT DOCUMENTS

| | | | |
|---|---|---|---|
| 2002/0177003 A1* | 11/2002 | Myrick | ................... E04C 5/015 |
| | | | 106/644 |
| 2017/0198478 A1* | 7/2017 | Ahagon | ..................... E04C 2/04 |
| 2022/0017425 A1* | 1/2022 | Wang | ................ C04B 35/62868 |

OTHER PUBLICATIONS

Czaderski et al., Iron-based shape memory alloys (Fe-SMA)—a new material for prestressing concrete structures, SMAR 2015—Third Conference on Smart Monitoring, Assessment and Rehabilitation of Civil Structures (Year: 2015).*

* cited by examiner

CORROSION-INDUCED SHAPE MEMORY FIBER, PREPARATION METHOD AND APPLICATION THEREOF

CROSS-REFERENCE TO RELATED APPLICATION

This application claims the priority benefit of China application serial no. 201811355681.8, filed on Nov. 14, 2018. The entirety of the above-mentioned patent application is hereby incorporated by reference herein and made a part of this specification.

BACKGROUND

Technical Field

The present invention relates to a corrosion-induced shape memory fiber, a preparation method and application thereof, and belongs to the technical field of civil engineering.

Description of Related Art

Concrete materials are now the most widely used artificial building materials in the world. However, due to the shortcomings such as brittleness, low tensile strength and low ultimate elongation, the concrete materials are prone to cracks and local damage in the use process and under the influence of surrounding environment. Corrosive media such as air, water and chloride ions invade the interior of a structure along the cracks to corrode steel bars, which shortens the service life of the engineering structure and endangers the safety of the structure. With the continuous innovation of engineering construction technology, hydraulic dams, railway engineering, highway bridges, ports and marine engineering, tunnels and mine engineering, pipeline engineering, nuclear power engineering, etc. put forward higher requirements for the performance of concrete, so fiber reinforced concrete emerged. With the use of fibers, the development of cracks is inhibited, and the crack resistance, toughness, impermeability and the like of the concrete are improved.

However, due to the low elongation and low tensile strength defects of concrete, it is difficult to solve the problems of brittleness and cracking even with high-strength and high-elastic modulus fibers such as carbon fibers and steel fibers, and the low-modulus organic fibers are more difficult in solving such problems. When a concrete structure generates cracks under the influence of temperature and humidity changes, uneven settlement and external load, the fibers produce stress that is far less than their own strength, and with the increase of cracking stress, micro cracks further increase and widen. Accordingly, the fiber input can only improve the crack resistance of concrete and reduce the crack width within a small cracking stress range. In addition, once the cracks occur, the fibers cannot repair and heal the cracks. If the cracks cannot be healed in time, the original micro cracks develop into macro cracks. Corrosive media enter the interior of the concrete through the cracks to quickly rust the steel bars, thereby affecting the safety and service life of the structure.

The repair of concrete cracks has always been a hotspot of concern and research in the academic and engineering circles. Once concrete cracks occur, it is not only technically demanding but also difficult to implement and cumbersome to operate by only human inspection and repair. Therefore, self-repairing concrete has emerged. Throughout the reports on self-repairing methods of cement concrete at home and abroad, there are currently three main categories:

1.1 Crystal Deposition:

According to the repair mechanism, the method contains three methods: mineral crystal deposition, cement-based permeable crystallization, and microbial crystallization.

(1) Mineral Crystal Deposition

Mechanism: One of the factors of crack repair in crystal deposition is to repair cracks by means of deposition of hydration products generated by continued hydration of fissure water, unhydrated cement particles and other mineral additives (e.g., $C_3S$, $C_2S$, etc.), but the repair effect is minimal, where the dominant factor is to block and heal cracks by deposition of $CaCO_3$ crystal generated by water-soluble $CO_2$ and slightly soluble $Ca(OH)_2$.

Problems in mineral crystal deposition: the healing function of the method is greatly affected by the age of concrete, the size, quantity and distribution of cracks, and the specific environment, the healing period is long, the healing function of the concrete at the later age is basically lost, and the cracks having the widths of more than 0.15 mm are basically difficult to heal.

(2) Cement-Based Permeable Crystallization

Mechanism: The cement-based permeable crystallization material is composed of ordinary Portland cement, quartz sand, and chemical composites with active functional groups. When the concrete added with the permeable crystallization material is dried, the active functional groups are dormant. When the concrete cracks, water permeates. When the $Ca^{2+}$ concentration at the cracks decreases to a certain extent, the active functional groups undergo condensation polymerization to form new crystals, and the cracks are quickly and automatically filled and repaired.

Problems in cement-based permeable crystallization: the self-repairing widths of cracks are limited, and the repair effect on the cracks having the widths of more than 0.4 mm is poor.

(3) Microbial Crystallization

Mechanism: The microbial repair technology is to add specific harmless bacteria (aerobic basophilic bacilli) into the concrete material, where the non-destructive concrete has a high-alkali anoxic environment inside, and the bacteria are dormant. When the concrete structure is damaged and cracked, oxygen and water permeate to activate bacterial spores, and $CO_2$ generated in the metabolism process reacts with $Ca^{2+}$ in the concrete material to generate calcium carbonate crystals to fill and repair the cracks.

Problems in microbial crystallization: The width range of self-healing cracks is limited, and only cracks less than 0.5 mm can be repaired; the bacteria have certain requirements for the operating environment and temperature, and have short service time and life span (about one year).

1.2 Repair Agent Filling

The method is applied to intelligent bionic self-healing concrete, and is divided into a microcapsule method and a hollow fiber (hollow optical fiber or hollow fiber) method according to the type of the repair agent carrier.

The two have similar repair mechanisms: Microcapsules/hollow fibers loaded with a repair adhesive are implanted into concrete. When the concrete structure is damaged and produces micro cracks during service and use, the microcapsules/hollow fibers break at the cracks, and the repair agent permeates the cracks from the breaches, contacts the catalyst dispersed in the concrete, and solidifies to quickly block the cracks so as to realize self-repair.

Problems in repair agent filling: The method involves a very complicated repair system, and the repair agent covers organic synthesis, polymer chemistry, fine chemicals, microcapsule/hollow fiber technology, implant technology and the like, is still in the experimental research stage, and has quite a lot of problems to be solved, mainly including: ① the quantity of carriers: too many carriers affect the strength of the concrete itself, and too few carriers are not enough to fill the cracks; ② the fracture strain of carriers: if the fracture strain is too large, the carriers are unlikely to tear, and the adhesive cannot flow out in time; if the fracture strain is too small, the carriers are easily broken during stirring, causing the adhesive to flow out in advance; ③ compatibility among the concrete matrix, the repair agent carrier and the adhesive, long-term stability of the repair agent, fluidity at the cracks, curing timeliness, etc.;

1.3 Shape Memory Alloy Driven Closure (SMA)

The method emerged with the repair agent filling method. In order to achieve the desired self-healing effect, the crack width of concrete has to be controlled. Otherwise, a large amount of repair carriers is required, which will affect the performance of the concrete. In addition, when the cracks of concrete are too wide, the capillary suction is reduced, the cracks above fiber tubes are difficult in absorbing glue, the glue flows down along the cracks under the action of gravity, and a little glue remains on the crack surface, so the repair effect is poor. To achieve the desired self-healing effect, the crack width of concrete has to be controlled. The existing intelligent materials that can sense external stimuli, deform actively and provide driving force, i.e., shape memory materials, mainly include shape memory alloys and shape memory polymers, wherein the memory polymer alloys with low deformation recovery force are not suitable for self-healing drive, and the shape memory alloys with high strength and large recovery force can achieve self-healing drive.

Mechanism: The SMA method stimulates the shrinkage deformation of shape memory alloy wires embedded in the concrete by electric heating to provide a driving force for the closure of cracks. The method actively adjusts the crack width by applying pre-stress to the structure, which cannot be implemented by the above several methods.

Problems in shape memory alloy driven closure: Since the shape memory alloys are thermotropic deformation materials, electric heating is required to stimulate the shrinkage of alloy wires, a series of supporting equipment is required to drive crack closure, and the whole driving and control system is complicated and cumbersome. Since the resistance of the SMA materials themselves is low, the electric heating has high requirements for current, power and wires. The heating temperature has a great influence on the shape recovery of SMA and the mechanical properties of concrete. Due to the heat conduction of concrete, the temperature control of SMA is technically difficult. If the temperature is too low, SMA is difficult to drive. If the temperature rises too high and unevenly, temperature cracks reappear in the concrete. In addition, a large amount of SMA is required to drive crack closure to realize self-repair, and SMA is expensive and is 700 times the price of ordinary steel, which is enough to suppress the application of SMA in concrete.

Based on the above, in order to reduce the economic loss and safety threat of concrete structures due to crack defects, it is urgent to repair the crack defects of concrete. In the current repair method, the cement-based permeable crystallization materials are relatively successful intelligent repair materials, but the repair effect is limited by crack width. Other methods are basically stuck in the experimental exploration stage due to the complexity of the repair mechanism, or the repair effect is poor. Therefore, in order to achieve the desired self-healing effect, it is very important to control the crack width of concrete.

SUMMARY

In view of the deficiencies of the prior art, the present invention first proposes a corrosion-induced shape memory fiber, a preparation method and application thereof.

The present invention provides a corrosion-induced shape memory fiber; the corrosion-induced shape memory fiber is composed of a core fiber and/or a core fiber with a corrosion-resistant coating, and a corrodible coating; the core fiber and/or the core fiber with the corrosion-resistant coating are in a tensile stress state along the length of the fiber; the corrodible coating is in a compressive stress state along the length of the fiber; the core fiber and/or the core fiber with the corrosion-resistant coating and the corrodible coating are in a tensile-compressive equilibrium state; and the corrodible coating is coated outside the core fiber and/or the core fiber with the corrosion-resistant coating.

Preferably, in an equivalent corrosive environment, the corrodible coating has a higher corrosion rate than the core fiber; and/or, in an equivalent corrosive environment, the corrodible coating has a higher corrosion rate than the core fiber with the corrosion-resistant coating.

Preferably, the present invention provides a corrosion-induced shape memory fiber;

the corrosion-induced shape memory fiber includes a core fiber and a corrodible coating, and the core fiber is partially or entirely coated with the corrodible coating; or the corrosion-induced shape memory fiber includes a corrosion-resistant coating, a core fiber, and a corrodible coating; the core fiber is partially or entirely coated with the corrosion-resistant coating; when the core fiber is partially or entirely coated with the corrosion-resistant coating, the obtained material is defined as A; the surface of the A is partially or entirely coated with the corrodible coating, or the corrosion-induced shape memory fiber includes a core fiber, a corrodible coating, and a corrosion-resistant coating; the core fiber is coated with the corrodible coating; the corrodible coating is partially coated with the corrosion-resistant coating; or the corrosion-induced shape memory fiber includes a core fiber and a corrodible coating; the core fiber is partially or entirely coated with the corrodible coating; the partial position outside the core fiber includes an end portion of the core fiber; when the end portion of the core fiber is coated with the corrodible coating, the corrodible coating at the end portion is also coated with a corrosion-resistant coating; or the corrosion-induced shape memory fiber includes a corrosion-resistant coating, a core fiber, and a corrodible coating; the core fiber is partially or entirely coated with the corrosion-resistant coating; when the core fiber is partially or entirely coated with the corrosion-resistant coating, the obtained material is defined as A; the surface of the A is partially or entirely coated with the corrodible coating, and when the end portion of the A is coated with the corrodible coating, the corrodible coating at the end portion is also coated with the corrosion-resistant coating;

wherein, the core fiber and/or the core fiber with the corrosion-resistant coating are in a tensile stress state along the length of the fiber; the corrodible coating is in a compressive stress state along the length of the fiber;

in an equivalent corrosive environment, the corrodible coating has a higher corrosion rate than the core fiber; and/or, in an equivalent corrosive environment, the corrodible coating has a higher corrosion rate than the core fiber with the corrosion-resistant coating.

According to the corrosion-induced shape memory fiber of the present invention, the core fiber is selected from at least one of an inorganic fiber and a polymer fiber; and the core fiber has an equivalent diameter of 20 mm or less, preferably 5 mm or less. The equivalent diameter is of a circular section converted from the cross sectional area of the fiber.

According to the corrosion-induced shape memory fiber of the present invention, the inorganic fiber is selected from at least one of C fiber, glass fiber, mineral fiber, basalt fiber, ceramic fiber, and metal fiber; the metal fiber is selected from at least one of steel fiber, plated M steel fiber, stainless steel fiber, copper alloy fiber, titanium alloy fiber, and nickel alloy fiber; and the M is selected from at least one of copper, nickel, chromium, tin, cadmium, and silver elements.

The polymer fiber is selected from at least one of polypropylene fiber, polyacrylonitrile fiber, polyvinyl alcohol fiber, polyethylene fiber, and aramid fiber.

According to the corrosion-induced shape memory fiber of the present invention, the material of the corrosion-resistant coating is selected from at least one of copper, nickel, chromium, cadmium, silver, gold, and ceramic materials. When the core fiber is a steel fiber, the material of the corrosion-resistant coating is selected from at least one of copper, nickel, chromium, cadmium, silver, and gold elements. When the core fiber is a steel fiber, the corrosion-resistant coating is prepared by plating or coating.

The present invention provides a preparation method of the corrosion-induced shape memory fiber, including: applying a tensile force to a core fiber or a core fiber with a corrosion-resistant coating; then preparing a corrodible coating on a set region of the surface of the core fiber; and removing the tensile force to obtain a sample; wherein the applied tensile force is 10% to 90% of the bearing capacity of the core fiber or the core fiber with the corrosion-resistant coating. The core fiber with the corrosion-resistant coating described in the preparation method includes at least two cases: the surface of the core fiber is uniformly coated with the corrosion-resistant coating in the first case, and the set region of the surface of the core fiber is coated with the corrosion-resistant coating in the second case. For industrial applications, if the corrosion-resistant coating is required at the end portion, the end portion of the obtained sample is further coated with a corrosion-resistant coating.

When the corrodible coating needs to be partially coated with the corrosion-resistant coating, the corrosion-resistant coating is directly prepared at a set position of the surface of the sample.

According to the preparation method of the corrosion-induced shape memory fiber of the present invention, in the entire corrosion-induced shape memory fiber, in order to maximize the pre-stress applied to the matrix by the memory fiber, the optimized acquisition method is:

in a case where the cross sectional area of the corrosion-induced shape memory fiber is definite, the pre-stress stored by the memory fiber is closely related to the volume fraction $V_f$ of the core fiber, and the axial force F stored by the core fiber is:

$$F = \sigma_f^p A_f = \tag{11}$$

-continued
$$\frac{E_c V_c \sigma_o A_f}{E_c V_c + E_f V_f} = \frac{E_c V_c \sigma_o V_f A}{E_c V_c + E_f V_f} = \frac{(1-V_f)V_f}{E_c(1-V_f) + E_f V_f} E_c \sigma_o A$$

when F is maximum, the pre-stress of the memory fiber applied to the matrix is maximum;

to solve the maximum value of the axial force of the core fiber, the F is first derived to obtain:

$$F' = \frac{(1-2V_f)[E_c(1-V_f) + E_f V_f] - (V_f - V_f^2)(E_f - E_c)}{[E_c(1-V_f) + E_f V_f]^2} E_c \sigma_o A \tag{12}$$

that is:

$$F' = \frac{(E_c - E_f)V_f^2 - 2E_c V_f + E_c}{[E_c(1-V_f) + E_f V_f]^2} E_c \sigma_o A \tag{13}$$

when F'=0, it is obtained:

$$(E_c - E_f)V_f^2 - 2E_c V_f + E_c = 0 \tag{14}$$

when $E_c = E_f$, $V_f = \frac{1}{2}$ is obtained, and the F may be maximum, i.e., $F_{max}$ is obtained;

when $E_c \neq E_f$, for the equation $$V_f^2 - \frac{2E_c}{E_c - E_f} V_f + \frac{E_c}{E_c - E_f} = 0, a = \frac{E_c}{E_c - E_f}$$

is assumed; since $E_c > 0$ and $E_f > 0$, $a < 0$ or $a > 1$, then $\Delta = 4a^2 - 4a > 0$, and the original equation has two different real roots, that is:

$$V_f = a \pm \sqrt{a^2 - a} = \frac{E_c \pm \sqrt{E_c E_f}}{E_c - E_f} = \frac{1 \pm \sqrt{E_f/E_c}}{1 - E_f/E_c} \tag{15}$$

because $0 < V_f < 1$, when $E_c < E_f$, $$V_f = \frac{1 + \sqrt{E_f/E_c}}{1 - E_f/E_c} < 0;$$

when $E_c > E_f$, $$V_f = \frac{1 + \sqrt{E_f/E_c}}{1 - E_f/E_c} > 1,$$

the real root $$V_f = \frac{1 + \sqrt{E_f/E_c}}{1 - E_f/E_c}$$

does not satisfy the condition $0<V_f<1$ and should be discarded; when $$V_f = a - \sqrt{a^2 - a} = \frac{E_c - \sqrt{E_c E_f}}{E_c - E_f} \quad (16)$$

$V_f$ satisfies the condition of formula 16, so that F may be maximum, that is, $F_{max}$ is obtained.

An application of the corrosion-induced shape memory fiber according to the present invention includes use of the fiber in concrete or in a fiber reinforced resin composite.

According to the application of the corrosion-induced shape memory fiber of the present invention, when the corrosion-induced shape memory fiber is used in concrete, the corrosion driving condition is the use environment of the concrete. In the use environment of the concrete, $H_2O/O_2$, $Cl^-$, $SO_4^{2-}$ and the like are main corrosive media, or acidic corrosive substances are main corrosive media, and these corrosive media are main factors that drive the corrosion-induced shape memory fiber to form a memory function. When applied in industry or engineering, the materials of the core fiber, the corrosion-resistant coating and the corrodible coating of the memory fiber are further adjusted according to the service environment of the concrete.

According to the application of the corrosion-induced shape memory fiber of the present invention, the corrosion-induced shape memory fiber is anchored in the concrete. The anchoring means may be at least one of bond anchoring and/or mechanical anchoring.

According to the application of the corrosion-induced shape memory fiber of the present invention, 0.01-20 v % of the corrosion-induced shape memory fiber is used in the concrete.

According to the application of the corrosion-induced shape memory fiber of the present invention, the material of the corrodible coating is preferably a corrodible iron metal material (such as elemental iron, low carbon iron, iron alloy, etc.), an iron-based metal material that is doped with harmful substances (harmful trace elements such as carbon, nitrogen, phosphorus and silicon) and is prone to electrochemical corrosion, or an alloy prone to intergranular corrosion.

The corrodible coating of the present invention may be composed of a single-layer material, a multi-layer material or a functionally graded material.

The cross section of the corrosion-induced shape memory fiber according to the present invention may be a circular, polygonal, or special-shaped cross section (including trough-shaped, cross, #-shaped, trilobal, quincuncial or star), the axial linear shape may be wavy, and the surface may be indented or ribbed.

The corrosion-induced shape memory fiber of the present invention may be composed of a single fiber or a stranded fiber obtained by twisting and stranding a plurality of fibers.

The core fiber in the corrosion-induced shape memory fiber of the present invention may be composed of a single fiber or a stranded fiber obtained by twisting and stranding a plurality of fibers.

The corrosion-induced shape memory fiber of the present invention forms an anchor end in a target body, and the anchor end is in a fully plated end hook shape, a bare end straight hook shape, a bare end bent hook shape, an end pier head anchor shape, or an end flat head anchor shape.

The corrosion-induced shape memory fiber of the present invention is in a flat shape, a prismatic shape, a wave shape, a hook shape, a large head shape, a double large head shape, a double pointed shape or a bundle shape.

In the present invention, all or part of the coating may be multi-layer or a composite coating.

Figure 7:
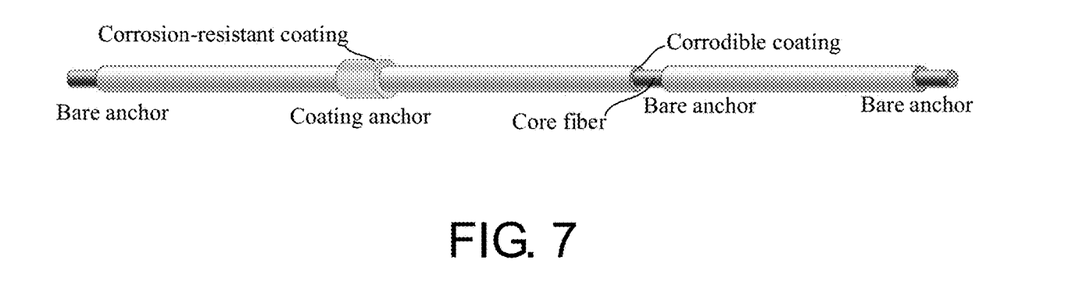
FIG. 7 is a layout diagram of anchor points.

In order to prevent the core fiber from losing an anchoring force transfer point to the concrete at the time of complete corrosion of the corrodible coating so that the force of the core fiber acting on the concrete fails, and in order to maintain the force of the core fiber permanently effective, an anchor end is preferably provided at the end portion of the fiber, or anchor points are provided at a plurality of sites of the longer memory fiber, as shown in FIG. 7.

According to the application of the corrosion-induced shape memory fiber of the present invention, when the corrosion-induced shape memory fiber is used in concrete, the construction and maintenance of the concrete are identical to those of the existing concrete.

Principles and Advantages

The present invention firstly proposes to add core fibers with corrodible coatings to concrete; through the anchoring effect of the concrete, the early corrosion resistance and cracking resistance of the concrete are equivalent to those of the existing concrete during use; once the core fibers with the corrodible coatings begin to corrode, the core fibers exhibit a function of gradually repairing the produced cracks until the cracks are completely closed; and this greatly prolongs the service life of the concrete. The addition of the core fibers with the corrodible coatings to the concrete can also reduce the early cracking probability of the concrete, improves the mechanical properties, durability and use safety of the concrete structure, and helps a lot to improve the crack resistance of a low-modulus polymer fiber concrete member.

The present invention proposes a corrosion-induced shape memory fiber and self-healing concrete. According to the principle, the surface of a pre-tensioned core fiber is coated with a corrodible coating to prepare a memory fiber (in which the core fiber is not easily corroded, but the corrodible coating is easily corroded), the shape recovery of the memory fiber is stimulated by corrosion of corrosive media in the environment, pre-stress is applied to the concrete to provide power for the crack closure of the concrete, larger pre-stress is applied when the corrosion of the corrodible coating is more severe, and the cracks are healed when the pre-stress is large enough. The application of pre-stress can improve the mechanical properties, durability and use safety of the concrete structure, provides a new design idea for shape memory materials, and provides a new concept for self-repairing and self-healing of composite materials such as concrete.

The present invention provides a corrosion-induced shape memory functional fiber. Shrinkage deformation of the memory fiber is driven by corrosive media entering the concrete in the environment, pre-stress is applied to the concrete to mechanically close concrete cracks, a new method is provided for intelligent self-healing of the concrete, and a new thought is provided for applying pre-stress to any position or any direction in concrete materials.

Preparation of corrosion-induced shape memory fiber and basic principle of self-healing concrete according to the prevent invention Preparation Method The corrosion-induced shape memory fiber (referred to as memory fiber in the present invention) is composed of a core fiber and a corrodible coating, wherein the core fiber is composed of a corrosion-resistant material or a material coated with a corrosion-resistant coating, and the corrodible coating is composed of a material that is easily corroded by corrosive media in the environment. The preparation method of the memory fiber is as shown in FIG. 1A to 1D, and the preparation steps are sequentially performed from FIG. 1A to 1D.

In FIG. 1A to 1D, a indicates that the core fiber is in an unstressed state; b indicates that the core fiber is pre-tensioned in an elastic range, and the tensile stress is $\sigma_o$; c indicates that the surface of the core fiber is uniformly coated with a corrodible coating by deposition, spraying or electroplating or the like when the tensile stress $\sigma_o$ is constant, and the corrodible coating is in an unstressed state; d indicates that the tensile force is removed after the coating is completed. It is assumed that the core fiber is well bonded to the corrodible coating. In the process of removal, the corrodible coating is axially shrunk under the elastic recovery force of the core fiber to produce compressive stress $\sigma_c^P$, a tensile-compressive equilibrium is finally established between the two, the corrodible coating stores pre-compression stress and corresponding pre-compression strain, and the core fiber stores pre-tension stress and corresponding pre-tension strain.

Shape Recovery Mechanism

Figure 1A:
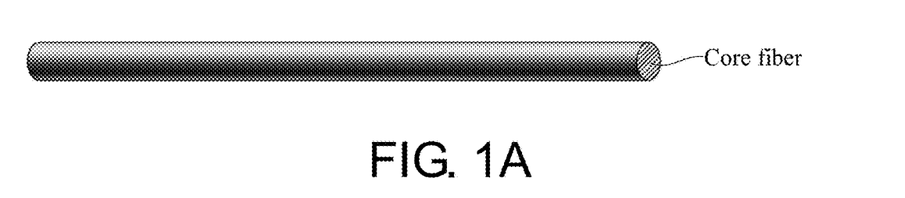
FIG. 1A to 1D are schematic diagram of a process of preparing a memory fiber.
Figure 1B:
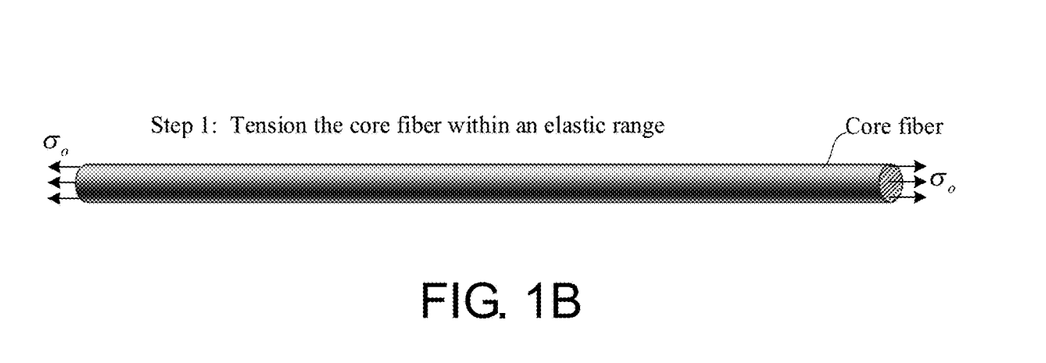
Figure 1C:
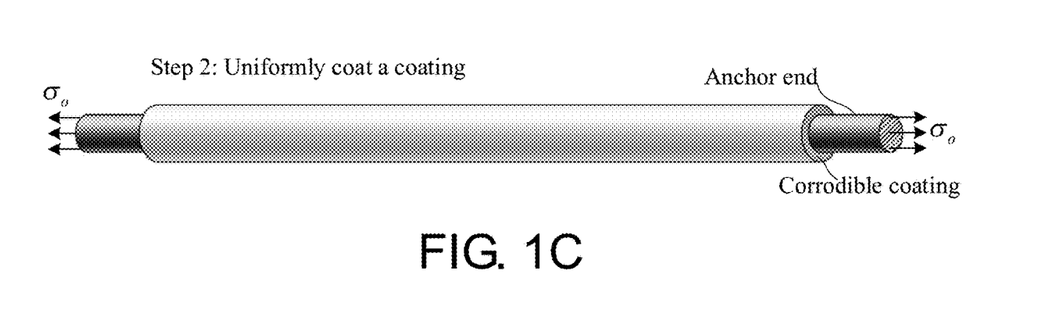
Figure 1D:
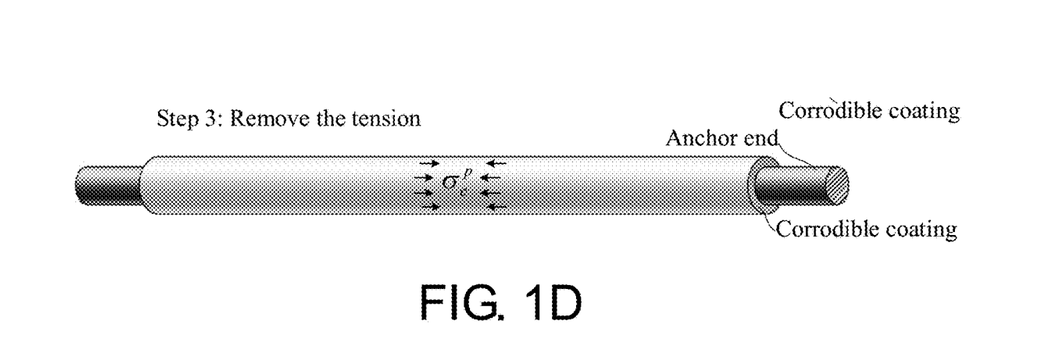
Figure 2A:
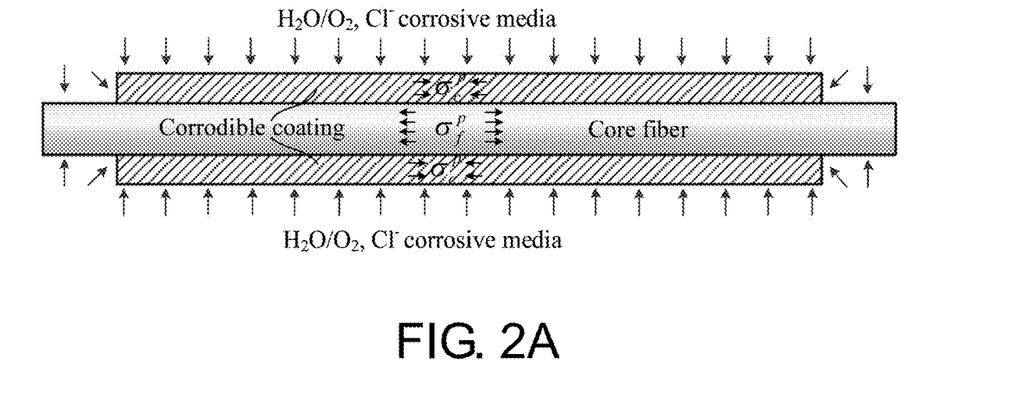
FIG. 2A to 2C are axial cross-sectional view of the shape recovery mechanism of the corrosion-induced shape memory fiber.
Figure 2B:
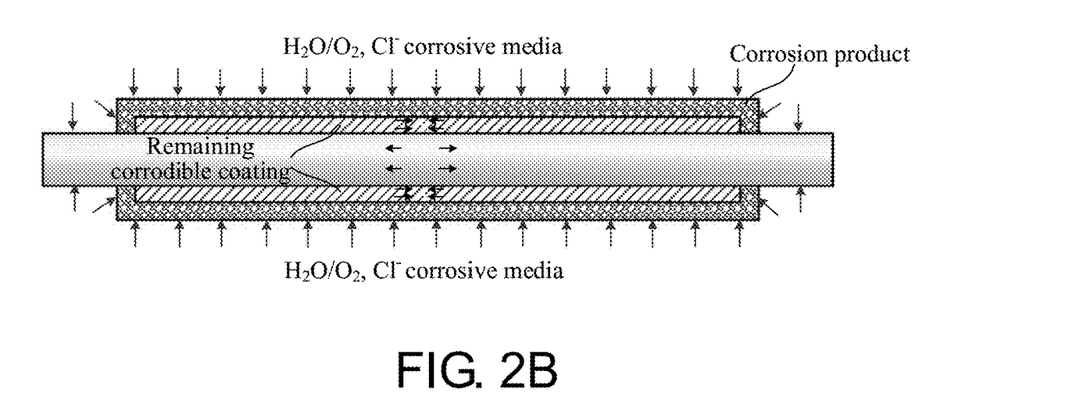
Figure 2C:
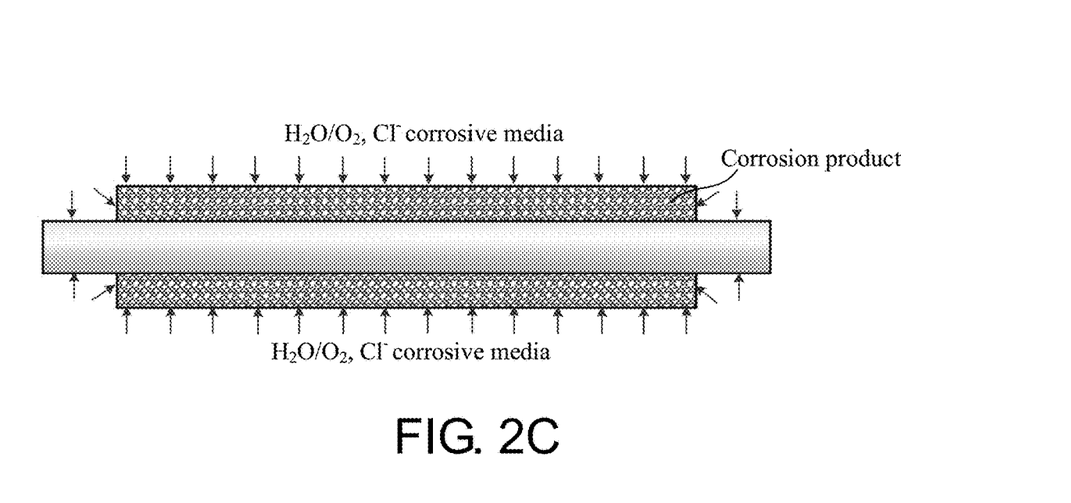

The shape recovery mechanism of the memory fiber is as shown in FIG. 2A to 2C. In the corrosive medium environment, when the corrodible coating is corroded and the cross section is lost, the memory fiber begins to recover, and the recovery flow proceeds sequentially from FIG. 2A to 2C. FIG. 2A shows that the memory fiber is not corroded, and the core fiber and the corrodible coating are in an original equilibrium state; FIG. 2B shows that in the corrosive medium environment, the corrodible coating is first in contact with corrosive media and corroded to generate a load-unbearable corrosion product, the cross section and strength of the core fiber with strong corrosion resistance are not lost, and because the effective force section of the corrodible coating after corrosion is thinned, the compressive stress and compressive deformation of the remaining corrodible coating increase constantly under the elastic recovery force of the core fiber, and then the core fiber shrinks and gradually approaches the initial length; FIG. 2C shows, after the corrodible coating is corroded thoroughly, the core fiber recovers to the original length to complete a single memory effect, and the core fiber at this time is in an unstressed state.

Therefore, the corrosion-induced shape memory fiber needs to satisfy two basic conditions for the shape memory function:

1. The core fiber axially stores pre-tension strain, the corrodible coating stores pre-compression strain, and the two are in a tensile-compressive equilibrium state;

2. The corrodible coating is composed of a material that is easily corroded by corrosive media in the environment, while the core fiber is composed of a corrosion-resistant material or a material coated with a corrosion-resistant coating.

Basic Principle of Self-Healing Concrete

Basic condition and principle of pre-stress application by the memory fiber

Figure 3A:
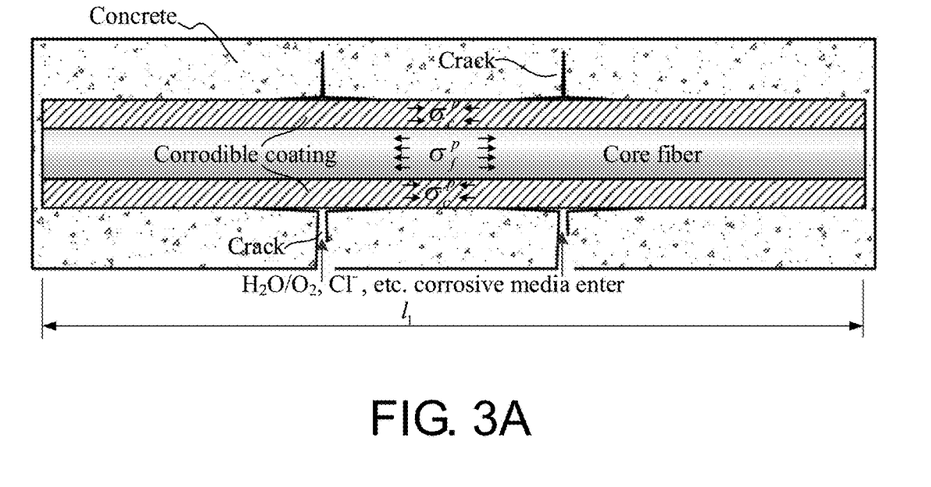
FIG. 3A to 3C are axial cross-sectional view of the self-healing principle of the corrosion driven memory fiber.
Figure 3B:
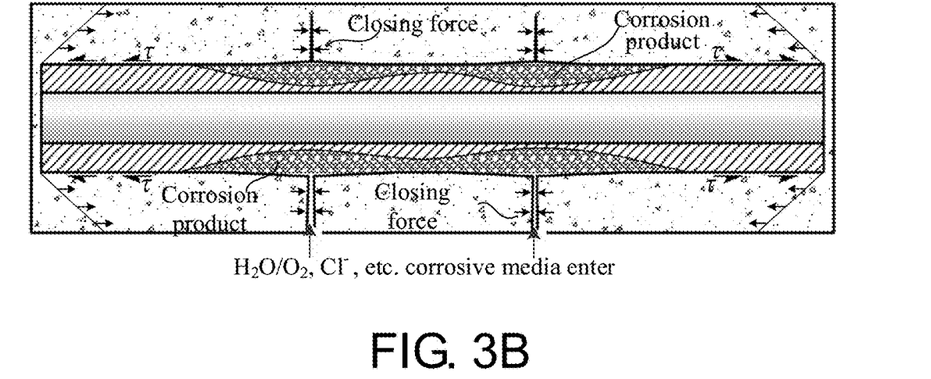
Figure 3C:
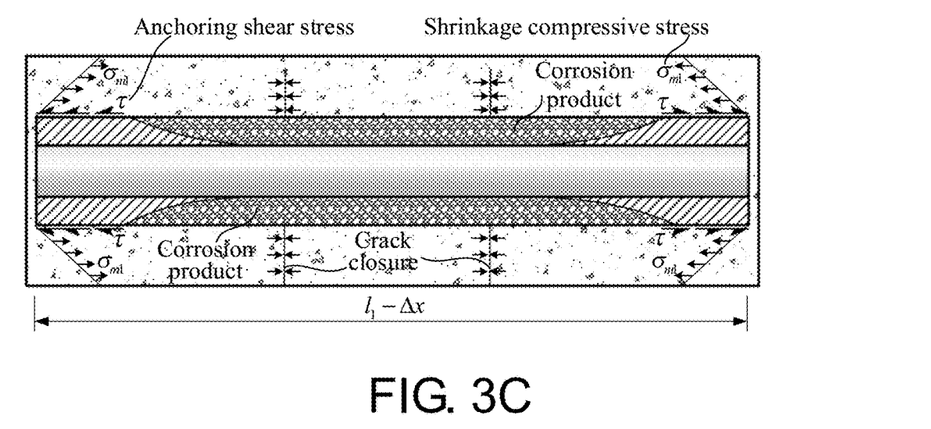
Figure 4A:
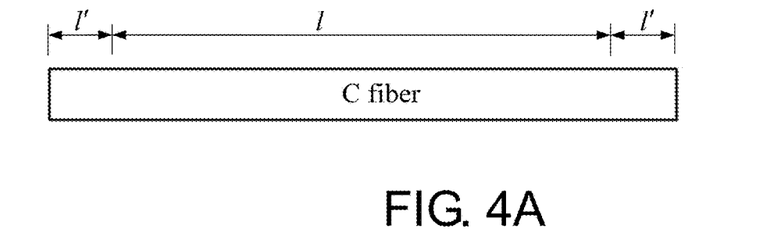
FIG. 4A to 4D are process diagram of force equilibrium of a corrodible coating under the action of elastic recovery force of a core fiber.
Figure 4B:
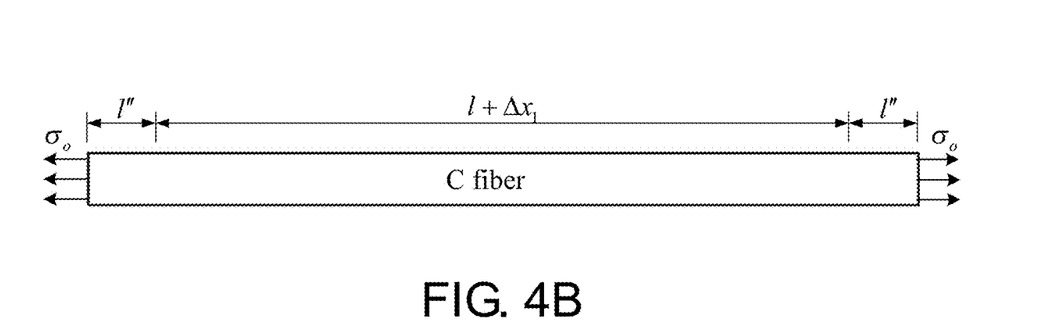
Figure 4C:
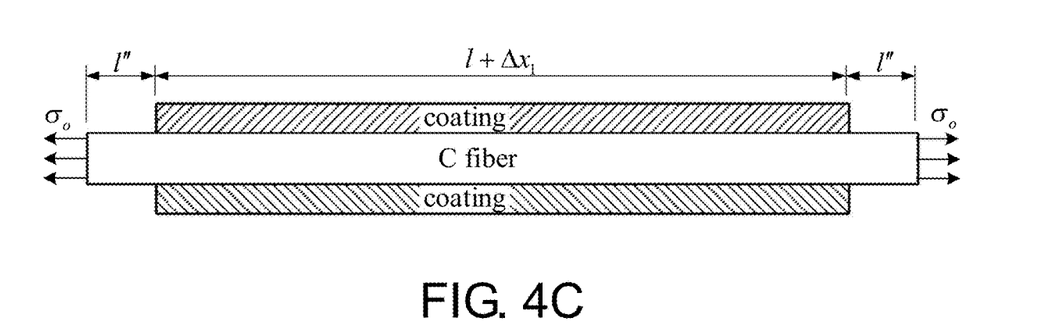
Figure 4D:
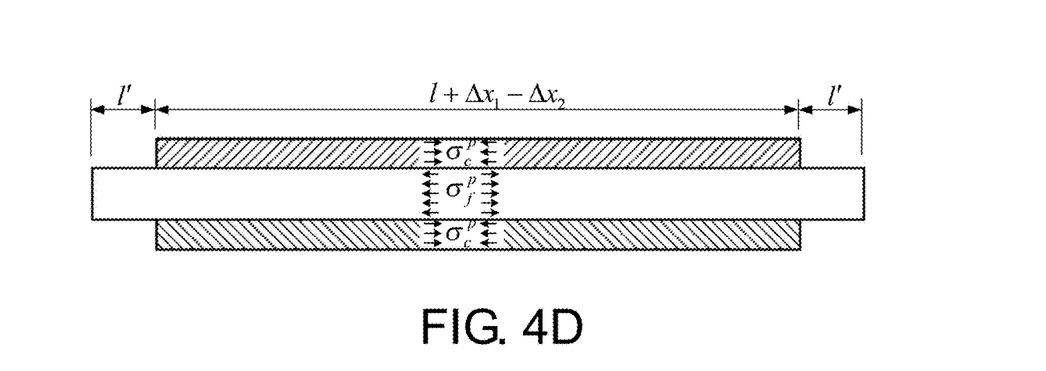

The concrete structure cracks due to the factors such as temperature, humidity and external force. The memory fiber at the crack defect is corroded by corrosive media in the environment, and its shape recovery is stimulated. Pre-pressure is applied to the concrete to provide power for crack closure. The principle of self-healing of the corrosion driven memory fiber is shown in FIG. 3A to 3C, and the self-healing process proceeds sequentially from FIG. 3A to 3C. FIG. 3A shows cracks in the concrete, but the memory fiber is not corroded and is in a stable state. FIG. 3B shows that the corrodible coating at the cracks chemically or electro-chemically reacts with the corrosive media, the memory fiber is stimulated to shrink and transfers load through a bonding region (the bonding anchor interface between the corrodible coating temporarily not corroded and the concrete) to apply pre-pressure to the concrete. If the degree of corrosion of the corrodible coating is higher, the closing force is larger, and the crack width is smaller. As shown in FIG. 3C, after the corrodible coating is corroded to a certain extent, when the closing force acting on the crack surface is large enough, the cracks are closed, the corrosive media are cut into the inner passage, the corrosion is stopped, and the self-healing protection function is realized. At this time, the shrinkage force and pre-pressure of the core fiber stop increasing.

However, if there are defects such as holes, the corrosive media may still enter the inside of the material to continue to corrode the memory fiber, the bonding anchor interface between the corrodible coating and the concrete continuously decreases, and the pre-pressure and pre-stress regions of the concrete continuously increase. When the anchor interface is insufficient to bear the drawing force caused by the shrinkage of the memory fiber, the memory fiber is pulled out, and the application of pre-stress fails. Alternatively, when the crack is close to the end portion of the memory fiber, the surface of the corrodible coating at the end region is corroded, and the end anchorage fails, so that the memory fiber cannot effectively pre-stress the concrete, and the crack is expanded again.

In order to pre-stress the concrete more effectively by the memory fiber, a reliable anchor end is preferably reserved at the end portion of the memory fiber, as shown in FIG. 3A to 3C, uncoated bare ends are reserved at two ends of the core fiber, or end hooks are reserved at two ends to ensure the reliability of the anchor end. Whether the crack is distributed at the end portion of the fiber or the corrodible coating is completely corroded, the fiber is unlikely to pull out in the presence of the reliable anchor end, thereby ensuring the effectiveness of the pre-stress and improving the crack resistance of the concrete.

Theoretical Calculation of Internal Force of Memory Fiber and Concrete

Theoretical Calculation of Internal Force of Memory Fiber

Basic Assumption

Since the memory fiber is a unidirectional composite material having a large enough slenderness ratio, in order to simplify the calculation of internal force of the memory fiber, the following assumptions may be made:

1) The corrodible coating is evenly coated on the core fiber;

2) The core fiber and the corrodible coating are well bonded at the interface and the two have good chemical compatibility;

3) The influence of transverse strain of the core fiber and the corrodible coating is ignored and not incorporated into the Poisson's ratio in formula derivation;

4) The force of the core fiber and the corrodible coating is in a linear elastic state;

5) The structural unit is pulled positive and compressed negative.

Formula derivation of internal force of memory fiber

As shown in FIG. 4A to 4D, it is assembled that the original length of the core fiber is l, the core fiber is tensioned, the tensile stress is $\sigma_o$, and the elongation is $\Delta x_1$. The length of the deposited coating is $l+\Delta x_1$, and the tensile force of the core fiber is removed. Due to the recovery force of the core fiber, the compressive deformation of the coating is $\Delta x_2$, and the core fiber and the coating achieve force equilibrium and coordinated deformation. According to Hooke's law:

Tensile force of the core fiber:

$$F_f = \frac{E_f A_f}{l}(\Delta x_1 - \Delta x_2) \quad (1)$$

Pressure of the corrodible coating:

$$F_c = \frac{E_c A_c}{l+\Delta x_1}(-\Delta x_2) \quad (2)$$

From force equilibrium, $F_f + F_c = 0$, then $$\frac{E_f A_f}{l}(\Delta x_1 - \Delta x_2) + \frac{E_c A_c}{l+\Delta x_1}(-\Delta x_2) = 0 \quad (3)$$

That is:

$$\Delta x_2 = \frac{E_f A_f \Delta x_1}{\frac{E_c A_c l}{l+\Delta x_1} + E_f A_f} \quad (4)$$

Because:

$$\sigma_c^p = E_c \varepsilon_c = E_c \frac{-\Delta x_2}{l+\Delta x_1} \quad (5)$$

Formula (4) is substituted into formula (5) to obtain:

$$\sigma_c^p = -\frac{E_c E_f A_f \Delta x_1}{E_c A_c l + E_f A_f (l+\Delta x_1)} \quad (6)$$

Supposing the cross sectional area of the memory fiber $$A = A_c + A_f, \varepsilon_f = \frac{\Delta x_1}{l}$$

The numerator and denominator on the right of formula (6) are simultaneously divided by $Al$, $$\sigma_c^p = -\frac{E_c E_f V_f \varepsilon_f}{E_c V_c + E_f V_f (1+\varepsilon_f)} \quad (7)$$

$$\varepsilon_f = \frac{\sigma_o}{E_f}$$

is substituted into formula (7), and the compressive stress of the corrodible coating is:

$$\sigma_c^p = -\frac{E_c V_f \sigma_o}{E_c V_c + E_f V_f + V_f \sigma_o} \quad (8)$$

$\sigma_o$ is much smaller than $E_f$, so $$\sigma_c^p \approx -\frac{E_c V_f \sigma_o}{E_c V_c + E_f V_f} \quad (9)$$

At this point, the expression of pre-stress stored by the core fiber is:

$$\sigma_f^p = -\frac{\sigma_c^p V_c}{V_f} = \frac{E_c V_c \sigma_o}{E_c V_c + E_f V_f} = \frac{E_c V_c \sigma_o}{E_1} \quad (10)$$

In all formulas of the present invention:

$\sigma_o$ is the initial tensile stress value of the core fiber;

$\sigma_c^p$ is the pre-stress value of the corrodible coating;

$E_1 = E_f V_f + E_c V_c$ is the elastic modulus (composite elastic modulus) of the memory fiber.

$E_c$ and $E_f$ are respectively the elastic moduli of the corrodible coating and the core fiber (when the core fiber carries a corrosion-resistant coating, its elastic modulus is calculated according to the formula of a composite elastic modulus);

$V_c$ and $V_f$ are respectively volume fractions of the corrodible coating and the core fiber, $V_c + V_f = 1$;

$A_c$ and $A_f$ are respectively cross sectional areas of the corrodible coating and the core fiber, $A_c + A_f = A$;

$\varepsilon_c$ is the strain after equilibrium of the corrodible coating;

$\varepsilon_f$ is the initial tensile strain of the core fiber.

Pre-Stress Storage Optimization of Memory Fiber

For the memory fiber of the same cross sectional area, the pre-stress stored by the memory fiber is closely related to the volume fraction $V_f$ of the core fiber, and the axial force F stored by the core fiber is:

$$F = \sigma_f^p A_f = \quad (11)$$

$$\frac{E_c V_c \sigma_o A_f}{E_c V_c + E_f V_f} = \frac{E_c V_c \sigma_o V_f A}{E_c V_c + E_f V_f} = \frac{(1-V_f)V_f}{E_c(1-V_f) + E_f V_f} E_c \sigma_o A$$

When F is maximum, the pre-stress of the memory fiber applied to the matrix is maximum.

To solve the maximum value of the axial force of the core fiber, the F is first derived to obtain:

$$F' = \frac{(1-2V_f)[E_c(1-V_f) + E_f V_f] - (V_f - V_f^2)(E_f - E_c)}{[E_c(1-V_f) + E_f V_f]^2} E_c \sigma_o A \quad (12)$$

That is:

$$F' = \frac{(E_c - E_f)V_f^2 - 2E_c V_f + E_c}{[E_c(1 - V_f) + E_f V_f]^2} E_c \sigma_o A \qquad (13)$$

When F'=0, it is obtained:

$$(E_c - E_f)V_f^2 - 2E_c V_f + E_c = 0 \qquad (14)$$

When $E_c = E_f$, $V_f = \frac{1}{2}$ is obtained, and the F may be maximum.

When $E_c \neq E_f$, for the equation $$V_f^2 - \frac{2E_c}{E_c - E_f} V_f + \frac{E_c}{E_c - E_f} = 0, \ a = \frac{E_c}{E_c - E_f}$$

is assumed; since $E_c > 0$ and $E_f > 0$, a<0 or a>1, then $\Delta = 4a^2 - 4a > 0$, and the original equation has two different real roots, that is:

$$V_f = a \pm \sqrt{a^2 - a} = \frac{E_c \pm \sqrt{E_c E_f}}{E_c - E_f} = \frac{1 \pm \sqrt{E_f/E_c}}{1 - E_f/E_c} \qquad (15)$$

Because $0 < V_f < 1$, when $E_c < E_f$, $$V_f = \frac{1 + \sqrt{E_f/E_c}}{1 - E_f/E_c} < 0;$$

when $E_c > E_f$, $$V_f = \frac{1 + \sqrt{E_f/E_c}}{1 - E_f/E_c} > 1,$$

the real root $$V_f = \frac{1 + \sqrt{E_f/E_c}}{1 - E_f/E_c}$$

does not satisfy the condition $0 < V_f < 1$ and should be discarded; when $$V_f = a - \sqrt{a^2 - a} = \frac{E_c - \sqrt{E_c E_f}}{E_c - E_f} \qquad (16)$$

$V_f$ satisfies the condition of formula 16, so that F may be maximum, that is, $F_{max}$.

When applied in engineering, if the calculated value of formula 16 is not in the range of 5 v % to 95 v %, the volume fraction $V_f$ of the core fiber is preferably adjusted to 5 v % to 95 v %.

Calculation of Internal Force of Memory Fiber Concrete

In order to ensure that the memory fiber can continue to function under complicated conditions, the memory fiber reserved with the permanent anchor end is added into the concrete, and the pre-stress of the concrete is predicted when the shape of the memory fiber is recovered. The permanent anchor end involves the following two cases:

In the first case, the corrosion-induced shape memory fiber is composed of a core fiber and a corrodible coating; the surface of the core fiber is partially not coated with the corrodible coating, the core fiber is located in the concrete, the portion of the core fiber not coated with the corrodible coating is a permanent anchor end, and the length of any permanent anchor end is defined as l';

In the second case, the corrosion-induced shape memory fiber is composed of a core fiber, a corrodible coating, and a corrosion-resistant coating; the permanent anchor end is a portion where the surface of the core fiber is coated with the corrodible coating and the corrodible coating is coated with the corrosion-resistant coating; at the same time, the core fiber is located in the concrete, wherein the length of any permanent anchor end is defined as l;

In order to simplify the calculation, the influence of the Poisson's ratio on the magnitude of the axial stress is disregarded.

Basic Assumption

In order to simplify the calculation of interaction between the memory fiber and the concrete, the following assumptions are made:

1) The memory fiber is unidirectionally and uniformly arranged in a concrete member;

2) The influence of the Poisson's ratio on the axial stress is disregarded;

3) The permanent anchor end is tightly bonded with the concrete without slippage;

4) The force influence of the corrosion product of the corrodible coating is disregarded;

Pre-Pressure of Concrete

After the cross section of the corrodible coating is completely lost, because the corrosion product does not participate in the force, the core fiber and the concrete establish a final tensile-compressive equilibrium, and the pre-stress applied to the concrete by the shrinkage of the core fiber is maximum. According to formula (9), it can be known that the pre-compression stress $\sigma_m^P$ applied to the concrete by the shrinkage of the core fiber is:

$$\sigma_m^p = -\frac{E_m \frac{V_{f1}}{1 - V_{c1}} \sigma_f^p}{E_2} = -\frac{E_m V_{f1} \sigma_f^p}{E_f V_{f1} + E_m V_m} \qquad (17)$$

The tensile stress of the core fiber is:

$$\sigma_{f1}^p = \frac{E_m V_m \sigma_f^p}{E_f V_{f1} + E_m V_m} \qquad (18)$$

In order that the permanent anchor end is reliable without slipping, a sufficient length is required. It is assumed that the bonding anchoring force of the permanent anchor end is $T_a = \tau \pi d l'$, and the drawing force of the memory fiber is $T_t = \sigma_{f1} \frac{1}{4} \pi d^2$. According to the equilibrium between the bonding anchoring force of the permanent anchor end and the drawing force of the memory fiber, $T_a = T_t$, i.e., $\tau \pi d l' = \sigma_{f1} \frac{1}{4} \pi d^2$, it is obtained:

$$l' = \frac{d\sigma_{f1}}{4\tau} \qquad (19)$$

Formula (18) is substituted into formula (19) to obtain:

$$l' = \frac{d\sigma_{f1}}{4\tau} = \frac{dE_m V_m \sigma_f^p}{4\tau(E_f V_{f1} + E_m V_m)} \quad (20)$$

If the permanent anchor end is reliable without slipping, $$l' \geq \frac{dE_m V_m \sigma_f^p}{4\tau(E_f V_{f1} + E_m V_m)} \quad (21)$$

Where,
The composite elastic modulus of the core fiber and the concrete is:

$$E_2 = E_f \frac{V_{f1}}{1 - V_{c1}} + E_m \frac{V_m}{1 - V_{c1}};$$

The elastic modulus of the concrete is: $E_m$;
In the finished product, the volume fractions of the core fiber, the corrodible coating, and the concrete are $V_{f1}$, $V_{c1}$, and $V_m$, respectively, $V_{f1}+V_{c1}=V_s$, $V_{f1}+V_{c1}+V_m=1$.

$\tau$ is the bonding force between the memory fiber and the concrete at the interface (when the properties of the concrete and the composition and structure of the memory fiber are known, $\tau$ can be determined), l' is the anchor length (the length of one end) of the permanent anchor end in the concrete, and d is the diameter of the cross section of the anchor end.

DESCRIPTION OF THE EMBODIMENTS

Basic Material Parameters
According to the above calculation formula of internal force, the core fiber of the memory fiber is a copper-plated steel fiber (diameter 0.2 mm, regardless of copper plating amount), and the corrodible coating is made of metal iron. When the cross sectional areas of the core fiber and the corrodible coating are 1:1, the pre-stress storage of the memory fiber is maximum. The amount of memory fibers in concrete is 4 v %, and the basic parameters of the memory fibers and the concrete are shown in Table 1.

TABLE 1

Basic material parameters of corrodible coating, core fiber and concrete

| Material parameters | Material type | | |
|---|---|---|---|
| | Corrodible coating | Core fiber | Concrete |
| Elastic modulus/GPa | 200 | 200 | 35 |
| Volume fraction | 50%*4% | 50%*4% | 96% |
| Initial tensile stress $\sigma_o$ | — | 1000 MPa | — |

Axial stress of concrete when the pre-stress is completely released:
It is assumed that the memory fiber is unidirectionally and uniformly arranged in the concrete, the cross section of the corrodible coating is lost, and the pre-stress applied to the concrete by the shape recovery of the memory fiber is maximum.
Stress stored by the core fiber:

$$\sigma_f^p = \frac{200 \times 10^3 \times 50\% \times 1000}{200 \times 10^3 \times 50\% + 200 \times 10^3 \times 50\%} = 500 \text{ (MPa)}$$

Pre-stress applied to the concrete by the shrinkage of the core fiber is:

$$\sigma_m^p = \frac{35 \times 10^3 \times 2\% \times 500}{200 \times 10^3 \times 2\% + 35 \times 10^3 \times 96\%} = -9.3 \text{ (MPa)}$$

From the above calculation results, it can be known that the maximum pre-compression stress released to the concrete by 4% of memory fibers is 9.3 MPa. If the volume fraction of the memory fiber and the initial tensile force of the core fiber continue to increase, the pre-stress applied to the concrete continues to increase.

Figure 5:
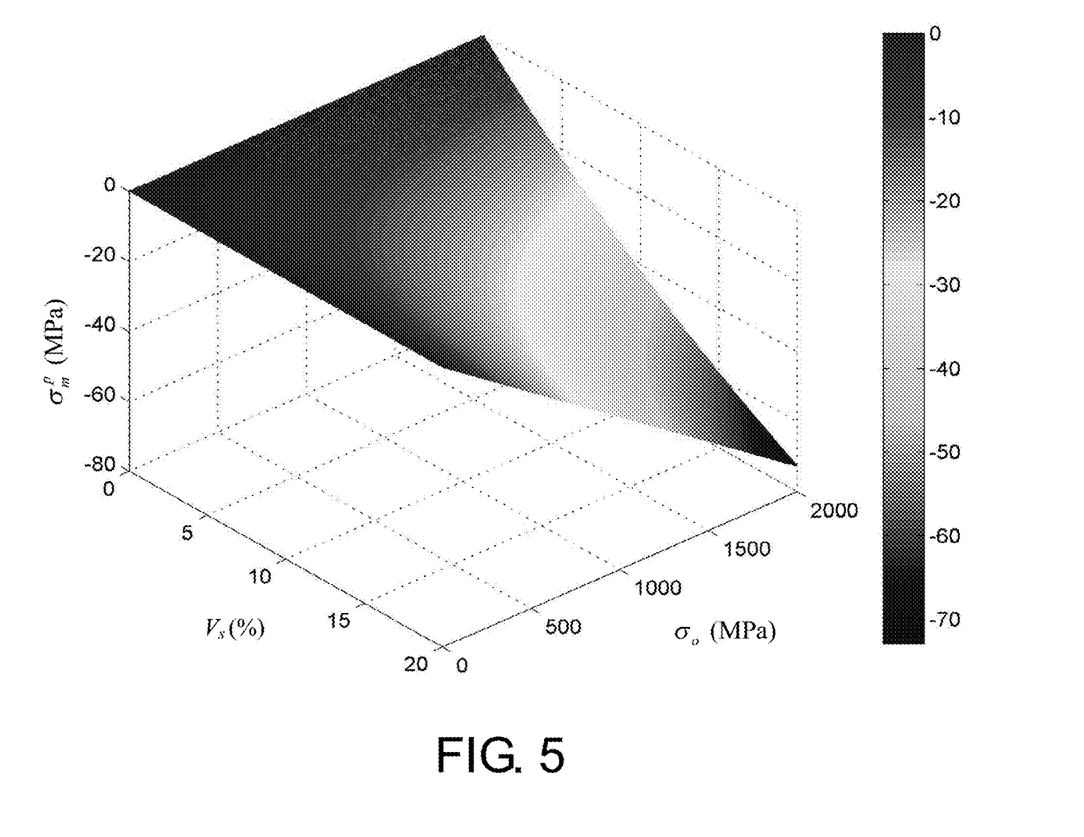
FIG. 5 is a diagram showing the influence of the amount of memory fibers and the change of initial tensile stress on the pre-stress of concrete during the calculation of Embodiment 1.
Figure 6A:
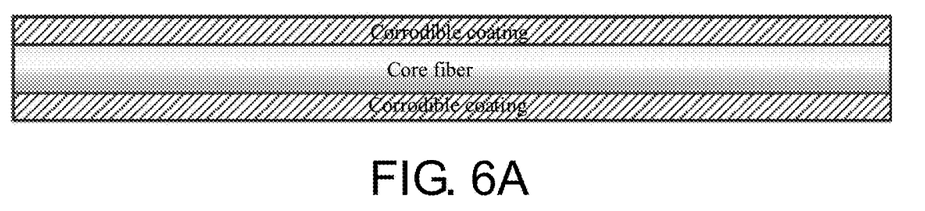
FIG. 6A to 6F are axial cross-sectional view showing several structures of the memory fiber according to the present invention.
Figure 6B:
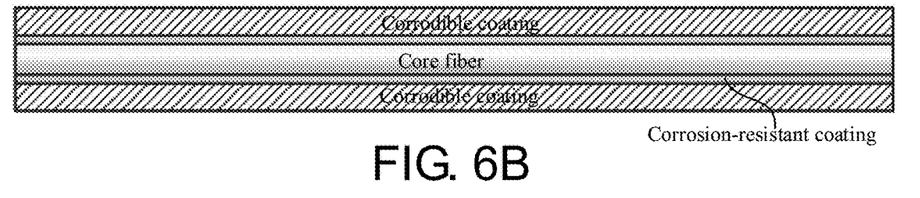
Figure 6C:
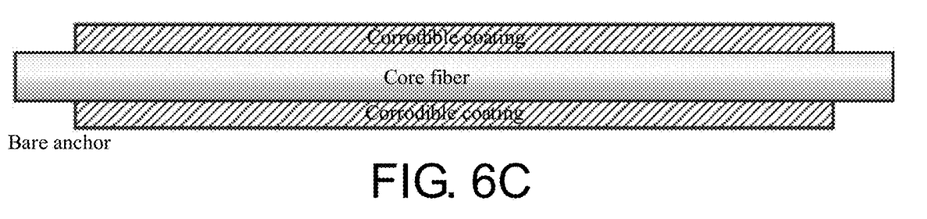
Figure 6D:
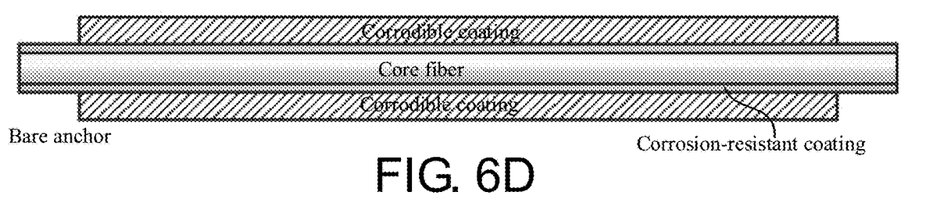
Figure 6E:
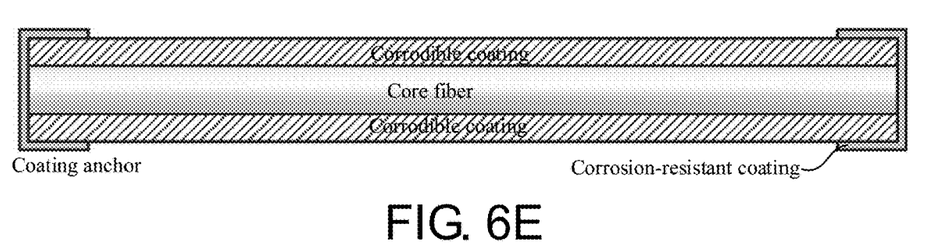
Figure 6F:
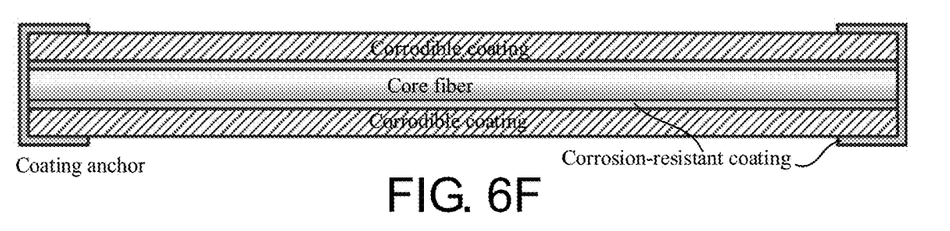

As shown in FIG. 5, when the volume fraction $V_s$ of the memory fiber and the initial tensile force $\sigma_o$ of the core fiber continuously increase, the pre-compression stress of the matrix also continuously increases. Therefore, the magnitude of pre-stress can be controlled by the initial tensile stress and volume fraction of the memory fiber. The application of pre-stress is beneficial to crack closure of concrete, reduction of stress concentration, increase of rigidity, improvement of corrosion resistance, and improvement of toughness. The presence of pre-stress is highly helpful for the crack resistance of concrete members, especially low-modulus polymer fiber concrete members.

According to the above design and calculation, the following concrete samples are prepared:

Embodiment 1

Figure 8:
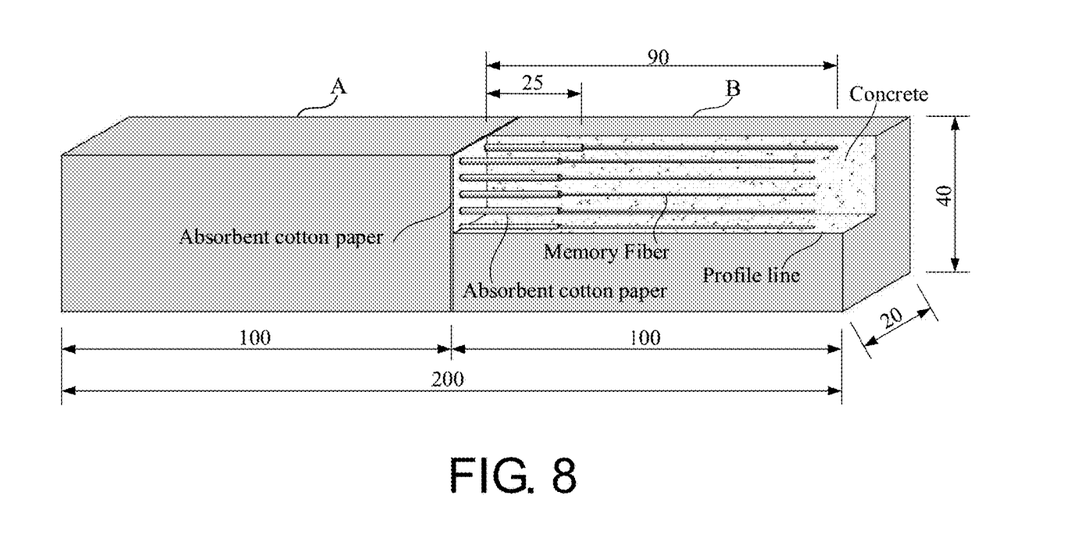
FIG. 8 is a structural schematic diagram of a concrete sample in Embodiment 1.

As shown in FIG. 8, the characteristics of the concrete sample are as follows. The concrete sample is 200 mm×20 mm×40 mm (length×width×height), and is divided into two parts A and B by a piece of absorbent cotton paper perpendicular to the length of the sample and having a thickness of 0.3 mm. The absorbent cotton paper simulates the sample to penetrate through a crack to form a corrosive medium passage. The two parts A and B of the sample are connected by 20 shape memory steel fibers having a length of 180 mm and a diameter of 0.28 mm. The core fiber of each memory fiber is a copper-plated steel fiber having a diameter of 0.2 mm and strength of 3000 MPa, the initial tensile stress of the core fiber is 2000 MPa, and the corrodible coating is made of an electroplated iron metal having a thickness of 0.04 mm. The 20 fibers are arranged side by side and vertically penetrate through the absorbent cotton paper, and the middle section of each fiber is wrapped with absorbent cotton paper having a length of 50 mm and a thickness of 0.2 mm as a water absorbing passage to increase the corrosion rate of the corrodible coating of the memory fiber and accelerate the recovery of the shape memory fiber.

The sample was immersed in a 6 wt % sodium chloride solution, a small amount of brown rust was found at the crack after 48 hours, and the crack was found to be narrowed after measurement; the rust on the absorbent cotton paper between the two parts A and B of the sample was cleaned, then the sample was continuously immersed in the sodium chloride solution for 48 hours, it was found that the brown rust oozing out from the cotton paper at the crack was less than the last time, and the crack was further narrowed after measurement; after the sample was continuously immersed for 15 weeks, no brown rust was found to ooze out from the crack, and the crack was basically closed. It shows that the corrosion-induced shape memory steel fibers are electrochemically corroded in the sodium chloride solution (the iron coating is rusted), the shapes of the memory fibers are recovered by means of the electrochemical corrosion, and the generated recovery force causes the parts A and B of the sample to approach each other, and squeezes the corrosive medium passage—absorbent cotton paper to become thinner so as to reduce the fluidity of the absorbent cotton paper. When the iron coating of the memory fibers is rusted more seriously, the recovery force of the memory fibers is larger, the absorbent cotton paper is finally squeezed to no longer have fluidity, the penetrating crack is closed, and the corrosive medium cannot enter the inside of the sample to form self-healing.

Comparative Example 1

The characteristics and preparation method of the concrete sample of Comparative Example 1 are substantially the same as those of Embodiment 1. The difference lies in that a 0.04 mm thick iron coating is electroplated when the core fibers of the 20 steel fibers for connecting the two parts A and B of the sample have an initial tensile stress of 0 MPa, that is, in the absence of tensile force.

The sample of Comparative Example 1 was immersed in a 6 wt % sodium chloride solution, a small amount of brown rust was found at the crack after 48 hours, and no change in crack width was found after measurement; the rust on the absorbent cotton paper between the two parts A and B of the sample was cleaned, then the sample was continuously immersed in the sodium chloride solution for 48 hours, brown rust was found to ooze out from the cotton paper at the crack, and the crack was not narrowed after measurement; after the sample was continuously immersed for 15 weeks, brown rust was still found to ooze out from the crack, and the width of the crack basically did not change. The experimental results show that the 20 steel fibers do not have a shape memory function, and the penetrating crack formed by the absorbent cotton paper cannot be closed, indicating that the steel fibers prepared by electroplating the iron coating in the absence of tension do not have the memory function and cannot heal concrete cracks.

Comparative Example 2

The characteristics and preparation method of the concrete sample of Comparative Example 2 are substantially the same as those of Embodiment 1. The difference lies in that a 0.04 mm thick copper coating is electroplated when the core fibers of the 20 steel fibers for connecting the two parts A and B of the sample have an initial tensile stress of 0 MPa, that is, in the absence of tensile force.

The sample of Comparative Example 2 was immersed in a 6 wt % sodium chloride solution, no abnormal change was found at the crack after 48 hours, and the width of the crack was kept unchangeable; after the sample was continuously immersed in the sodium chloride solution for 48 hours, no brown rust was oozed, and the width of the crack was kept unchangeable; after the sample was continuously immersed for 15 weeks, the crack still did not change, and the width of the crack was kept unchangeable. The experimental results show that the 20 steel fibers do not have a shape memory function, and the penetrating crack formed by the absorbent cotton paper cannot be closed, indicating that the steel fibers prepared by electroplating the copper coating do not have the memory function and cannot heal concrete cracks.

Comparative Example 3

The characteristics and preparation method of the concrete sample of Comparative Example 3 are substantially the same as those of Embodiment 1. The difference lies in that a 0.04 mm thick copper coating is electroplated when the core fibers of the 20 steel fibers for connecting the two parts A and B of the sample have an initial tensile stress of 2000 MPa, that is, in the presence of tensile force.

The sample of Comparative Example 3 was immersed in a 6 wt % sodium chloride solution, no abnormal change was found at the crack after 48 hours, and the width of the crack was kept unchangeable; after the sample was continuously immersed in the sodium chloride solution for 48 hours, no brown rust was oozed, and the width of the crack was kept unchangeable; after the sample was continuously immersed for 15 weeks, the crack still did not change, and the width of the crack was kept unchangeable. The experimental results show that the 20 steel fibers do not have a shape memory function, and the penetrating crack formed by the absorbent cotton paper cannot be closed, indicating that the steel fibers prepared by electroplating the copper coating in the presence of tension do not have the memory function and cannot heal concrete cracks.

Embodiment 2

The characteristics and preparation method of the concrete sample of Embodiment 2 are substantially the same as those of Embodiment 1. The difference lies in that the core fibers of the 20 steel fibers for connecting the two parts A and B of the sample are steel fibers not protected by copper plating, and the other situation is the same as that of Embodiment 1.

The sample was immersed in a 6 wt % sodium chloride solution, a small amount of brown rust was found at the crack after 48 hours, and the crack was found to be narrowed after measurement; the rust on the absorbent cotton paper between the two parts A and B of the sample was cleaned, then the sample was continuously immersed in the sodium chloride solution for 48 hours, it was found that the brown rust oozing out from the cotton paper at the crack was less than the last time, and the crack was further narrowed after measurement; after the sample was continuously immersed for 15 weeks, the crack was expanded, the wideset portion of the crack was 0.5 mm, the crack was 0.2 mm wider than the initial crack, and five steel fibers were broken. The experimental results show that although the 20 steel fibers have a shape memory function, since the surfaces of the core fibers are not plated with copper, the core fibers are electrochemically corroded and broken, the penetrating crack formed by the absorbent cotton paper is expanded, and the steel fibers cannot continue to provide a closing force for healing of concrete cracks.

Embodiment 3

The characteristics and preparation method of the concrete sample of Embodiment 3 are substantially the same as those of Embodiment 1. The difference lies in that the core fibers of the 20 steel fibers for connecting the two parts A and B of the sample have an initial tensile stress of 1500 MPa during preparation, and the other situation is the same as that of Embodiment 1.

The sample was immersed in a 6 wt % sodium chloride solution, and the test results were substantially the same as those in Embodiment 1 under the condition that the test conditions were identical to those in Embodiment 1.

The present invention also attempted to design other core materials (such as mineral fiber, carbon fiber, glass fiber, basalt fiber, ceramic fiber, and other metal fiber) and other corrodible coatings, and has achieved good results.

Based on the above, the corrosion-induced shape memory fiber designed and prepared in the present invention exhibits an excellent memory function under corrosive conditions, and exhibits an excellent crack closure function or a crack self-healing function when applied to concrete.

What is claimed is:

1. A corrosion-induced shape memory fiber, wherein the corrosion-induced shape memory fiber is composed of a core fiber and/or a core fiber with a corrosion-resistant coating, and a corrodible coating; the core fiber and/or the core fiber with the corrosion-resistant coating are in a tensile stress state along the length of the corrosion-induced shape memory fiber; the corrodible coating is in a compressive stress state along the length of the corrosion-induced shape memory fiber; the core fiber and/or the core fiber with the corrosion-resistant coating and the corrodible coating are in a tensile-compressive equilibrium state along the length of the corrosion-induced shape memory fiber; and the corrodible coating is coated outside the core fiber and/or the core fiber with the corrosion-resistant coating.

2. The corrosion-induced shape memory fiber according to claim 1, wherein:
in an equivalent corrosive environment, the corrodible coating has a higher corrosion rate than the core fiber; and/or, in an equivalent corrosive environment, the corrodible coating has the higher corrosion rate than the core fiber with the corrosion-resistant coating.

3. The corrosion-induced shape memory fiber according to claim 1, wherein the corrosion-induced shape memory fiber comprises the core fiber and the corrodible coating, and the core fiber is partially or entirely coated with the corrodible coating; or
the corrosion-induced shape memory fiber comprises the corrosion-resistant coating, the core fiber, and the corrodible coating; the core fiber is partially or entirely coated with the corrosion-resistant coating; when the core fiber is partially or entirely coated with the corrosion-resistant coating, a obtained material is defined as A; the surface of the A is partially or entirely coated with the corrodible coating; or
the corrosion-induced shape memory fiber comprises the core fiber, the corrodible coating, and the corrosion-resistant coating; the core fiber is coated with the corrodible coating; the corrodible coating is partially coated with the corrosion-resistant coating; or
the corrosion-induced shape memory fiber comprises the core fiber and the corrodible coating; the core fiber is partially or entirely coated with the corrodible coating; a partial position outside the core fiber comprises an end portion of the core fiber; when the end portion of the core fiber is coated with the corrodible coating, the corrodible coating at the end portion is also coated with the corrosion-resistant coating; or
the corrosion-induced shape memory fiber comprises the corrosion-resistant coating, the core fiber, and the corrodible coating; the core fiber is partially or entirely coated with the corrosion-resistant coating; when the core fiber is partially or entirely coated with the corrosion-resistant coating, a obtained material is defined as A; the surface of the A is partially or entirely coated with the corrodible coating, and when an end portion of the A is coated with the corrodible coating, the corrodible coating at the end portion is also coated with the corrosion-resistant coating;
wherein the core fiber and/or the core fiber with the corrosion-resistant coating are in the tensile stress state along the length of the fiber; the corrodible coating is in the compressive stress state along the length of the fiber;
in the equivalent corrosive environment, the corrodible coating has the higher corrosion rate than the core fiber; and/or, in the equivalent corrosive environment, the corrodible coating has the higher corrosion rate than the core fiber with the corrosion-resistant coating.

4. The corrosion-induced shape memory fiber according to claim 1, wherein the core fiber is selected from at least one of an inorganic fiber and a polymer fiber; and the core fiber has an equivalent diameter of 20 mm or less.

5. The corrosion-induced shape memory fiber according to claim 4, wherein:
the inorganic fiber is selected from at least one of carbon fiber, glass fiber, mineral fiber, basalt fiber, ceramic fiber, and metal fiber; the metal fiber is selected from at least one of steel fiber, plated M steel fiber, stainless steel fiber, copper alloy fiber, titanium alloy fiber, and nickel alloy fiber; the M is selected from at least one of copper, nickel, chromium, tin, cadmium, and silver elements;
the polymer fiber is selected from at least one of polypropylene fiber, polyacrylonitrile fiber, polyvinyl alcohol fiber, polyethylene fiber, and aramid fiber.

6. The corrosion-induced shape memory fiber according to claim 1, wherein the core fiber has the equivalent diameter of 5 mm or less.

7. The corrosion-induced shape memory fiber according to claim 1, wherein a material of the corrosion-resistant coating is selected from at least one of copper, nickel, chromium, cadmium, silver, and gold elements.

8. A method for using the corrosion-induced shape memory fiber according to claim 1, comprising:
  using the corrosion-induced shape memory fiber in concrete or in a fiber reinforced resin composite;
  when the corrosion-induced shape memory fiber is used in the concrete, the corrosion-induced shape memory fiber is anchored in the concrete, and a corrosion driving condition is a use environment of the concrete.

9. The method for using the corrosion-induced shape memory fiber according to claim 8, wherein 0.01-20 v % of the corrosion-induced shape memory fiber is used in the concrete.

* * * * *